United States Patent
Lobe et al.

(10) Patent No.: US 7,835,222 B2
(45) Date of Patent: Nov. 16, 2010

(54) ANTI-BIOFOULING SEISMIC STREAMER CASING AND METHOD OF MANUFACTURE

(75) Inventors: Henry J. Lobe, Annapolis, MD (US); Thomas K. Tolman, Annapolis, MD (US); Amulya Kumar Das, Everett, WA (US); John Russell Knapp, Bellevue, WA (US); Gary Moffat, Arlington, WA (US)

(73) Assignees: Severn Marine Technologies, LLC, Annapolis, MD (US); Mid-Mountain Materials, Inc, Mercer Island, WA (US)

( * ) Notice: Subject to any disclaimer, the term of this patent is extended or adjusted under 35 U.S.C. 154(b) by 82 days.

(21) Appl. No.: 11/464,247

(22) Filed: Aug. 14, 2006

(65) Prior Publication Data

US 2007/0201307 A1    Aug. 30, 2007

Related U.S. Application Data

(62) Division of application No. 10/879,069, filed on Jun. 30, 2004, now abandoned.

(51) Int. Cl.
    *G01V 1/38*    (2006.01)
(52) U.S. Cl. .......................................... 367/20; 367/15
(58) Field of Classification Search .................... 367/15, 367/20; 174/101.5
    See application file for complete search history.

(56) References Cited

U.S. PATENT DOCUMENTS

| | | | |
|---|---|---|---|
| 2,986,474 A | 5/1961 | Robbart | |
| 3,480,907 A | 11/1969 | King | |
| 3,702,778 A | 11/1972 | Mueller | |
| 3,744,016 A * | 7/1973 | Davis | 367/154 |
| 3,969,240 A | 7/1976 | Kolobow et al. | |
| 3,973,510 A | 8/1976 | McCulloch | |
| 3,987,537 A | 10/1976 | Warren | |
| 4,025,693 A | 5/1977 | Milne | |

(Continued)

FOREIGN PATENT DOCUMENTS

EP    0903389 A1    4/1997

(Continued)

OTHER PUBLICATIONS

Edwards, et al. "Resistance to Marine Fouling of Elastomeric Coatings of Some Poly(dimethylsiloxides) and Poly(dimethyldiphenylsiloxanes)." International Biodeterioration and Biodegradation (1994).*

(Continued)

*Primary Examiner*—Jack Keith
*Assistant Examiner*—Krystine Breier
(74) *Attorney, Agent, or Firm*—Dobe Law Group, LLC; Christopher Aniedobe

(57) ABSTRACT

An anti-biofouling seismic streamer casing (100,100') is provided that is formed by a flexible tubing (110) coated with a layer of a two-part heat cured silicone elastomer (120). The seismic streamer casing (100, 100') is formed by a method that includes steps of providing a flexible tubing (200) and pre-treating the outer surface of the tubing (210). Two parts of a two-part silicone elastomer are then mixed together (220). The method also includes coating the mixed two-part silicone elastomer on the flexible tubing (230), and heating the flexible tubing to cure the coating (240).

22 Claims, 5 Drawing Sheets

U.S. PATENT DOCUMENTS

| | | |
|---|---|---|
| 4,072,769 A | 2/1978 | Lidel |
| 4,108,825 A | 8/1978 | Hayes |
| 4,312,693 A | 1/1982 | Salensky et al. |
| 4,475,972 A | 10/1984 | Wong |
| 4,499,148 A | 2/1985 | Goodale et al. |
| 4,500,339 A | 2/1985 | Young et al. |
| 4,588,398 A | 5/1986 | Daugherty et al. |
| 4,602,959 A | 7/1986 | Kurita et al. |
| 4,661,400 A | 4/1987 | Guglielmo, Sr. |
| 4,844,986 A | 7/1989 | Karakelle et al. |
| 4,851,009 A | 7/1989 | Pinchuk |
| 4,861,670 A | 8/1989 | Lampe et al. |
| 4,866,106 A | 9/1989 | Pellow et al. |
| 4,894,254 A | 1/1990 | Nakayama et al. |
| 4,908,061 A | 3/1990 | Nanishi et al. |
| 4,990,547 A | 2/1991 | Stovicek |
| 5,096,488 A | 3/1992 | Stovicek |
| 5,116,611 A | 5/1992 | Masuoka et al. |
| 5,147,725 A | 9/1992 | Pinchuk |
| 5,154,747 A | 10/1992 | Yokoi et al. |
| 5,173,110 A | 12/1992 | Stovicek |
| 5,192,603 A | 3/1993 | Slater et al. |
| 5,221,331 A | 6/1993 | Ikari et al. |
| 5,229,436 A | 7/1993 | Kadota et al. |
| 5,248,221 A | 9/1993 | Gerhart et al. |
| 5,298,060 A | 3/1994 | Harakal et al. |
| 5,331,074 A | 7/1994 | Slater et al. |
| 5,332,431 A | 7/1994 | Yokoi et al. |
| 5,348,576 A | 9/1994 | Yokoi et al. |
| 5,449,553 A * | 9/1995 | Griffith ................ 428/332 |
| 5,514,731 A | 5/1996 | Nakai |
| 5,576,109 A | 11/1996 | Yoneda et al. |
| 5,603,755 A | 2/1997 | Okada et al. |
| 5,663,215 A | 9/1997 | Milligan |
| 5,691,019 A | 11/1997 | Carroll et al. |
| 5,736,249 A | 4/1998 | Smith et al. |
| 5,843,149 A | 12/1998 | Ebert et al. |
| 5,904,988 A | 5/1999 | Stein et al. |
| 5,906,893 A | 5/1999 | Stein |
| 6,020,026 A | 2/2000 | Birch et al. |
| 6,048,580 A * | 4/2000 | Carter et al. ............ 427/407.1 |
| 6,101,973 A | 8/2000 | Stewart et al. |
| 6,221,498 B1 | 4/2001 | Takahama et al. |
| 6,348,237 B2 | 2/2002 | Kohler et al. |
| 6,403,105 B1 | 6/2002 | Stein |
| 6,489,031 B2 * | 12/2002 | Muller et al. ............. 428/447 |
| 6,506,331 B2 * | 1/2003 | Meguriya ................. 264/327 |
| 6,570,821 B1 | 5/2003 | Moresco |
| 6,673,179 B1 * | 1/2004 | Mangum et al. ............. 156/79 |
| 2001/0032568 A1 | 10/2001 | Schutt |
| 2001/0051274 A1 * | 12/2001 | Alberte et al. .......... 428/411.1 |
| 2004/0017731 A1 | 1/2004 | Halvorsen et al. |
| 2006/0054186 A1 * | 3/2006 | Lepage et al. ................ 134/6 |
| 2006/0144286 A1 * | 7/2006 | Baum ......................... 106/18 |

FOREIGN PATENT DOCUMENTS

| | | |
|---|---|---|
| JP | 2002069246 A | 8/2002 |
| WO | WO 93/17354 | 9/1993 |

OTHER PUBLICATIONS

Harper, Donald E. "Fouling of Towed Seismic Streamers Off Central Africa by the Lepadomorph Barnacle Conchoderma Virgatum." Crustaceana 68 (6), 1994.*

Callow and Callow. "Marine biofouling: a sticky problem." Biologist (2002) 49 (1).*

Electrolube, "Technical Data Sheet," Mar. 1997.*

* cited by examiner

ANTI-BIOFOULING SEISMIC STREAMER CASING AND METHOD OF MANUFACTURE

This patent application is a divisional application of U.S. patent application Ser. No. 10/879,069, filed Jun. 30, 2004, which is incorporated herein by reference.

TECHNICAL FIELD OF THE INVENTION

The present invention directs itself to anti-biofouling coatings. In particular, this invention is directed to an anti-biofouling coating for a flexible tubing material to produce seismic streamer casings. Further, this invention is directed to a method forming a seismic streamer casing wherein a two-part, heat cured, silicone elastomer is applied to a flexible tubing that has been pretreated to increase the adhesion of the coating to the flexible tubing.

BACKGROUND OF THE INVENTION

Marine biofouling on the hulls of ships has been a problem for centuries. More recently, as more undersea sensors and robotic systems have been utilized for extended periods of time, the control of biofouling has become more critical. Historically, anti-biofouling coatings utilized biocides that leach out from the coating over time to thereby prevent biofouling settlement by virtue of the biocides' toxicity to marine organisms. This method of control has had a number of problems associated therewith. First, the biofouling resistance of the coating decreases with time as the biocides are depleted by their leaching out. Furthermore, the toxic coatings increase the danger of toxic exposure to shipyard workers, create a hazardous waste disposal problem, and have a detrimental environmental impact on marine wildlife.

The use of some elastomer based coatings resist fouling by presenting a surface that is unsuitable for strong adhesion of the fouling organisms. While silicone coatings have an inherent non-stick nature, it has been possible to provide satisfactory adhesion between silicone coatings and relatively rigid substrates by the use of one or more intermediate primer layers to provide a bond between the substrate, such as a boat hull, and the silicone outer layer. The silicone elastomer that has traditionally been utilized in these systems is of the room temperature vulcanizing type, also known as condensation cured silicone elastomers.

The best prior art known to the Applicants include U.S. Pat. Nos. 2,986,474; 3,973,510; 3,987,537; 4,025,693; 4,072,769; 4,312,693; 4,844,986; 4,894,254; 5,449,553; 5,691,019; 6,101,973; 6,221,498; 6,348,237; 6,403,105; and, 6,570,821, and published U.S. patent applications Ser. Nos. 2001/0032568 and 2004/0017731. None of the prior art systems disclose a two-part, heat cured silicone elastomer that is applied to a flexible tubing material for providing anti-biofouling. Additionally, the known prior art does not disclose a method for applying a silicone elastomer anti-biofouling coating in a continuous automated process.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description of some embodiments that are presented later.

The present invention provides a seismic streamer casing is provided that includes a flexible tubing coated with a layer of a two-part heat cured silicone elastomer to provide anti-biofouling therefore. The seismic streamer casing is formed by a method that includes steps of providing a flexible tubing and mixing together two parts of a two-part silicone elastomer. The method also includes coating the mixed two-part silicone elastomer on the flexible tubing, and heating the cured flexible tubing to cure the coating.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
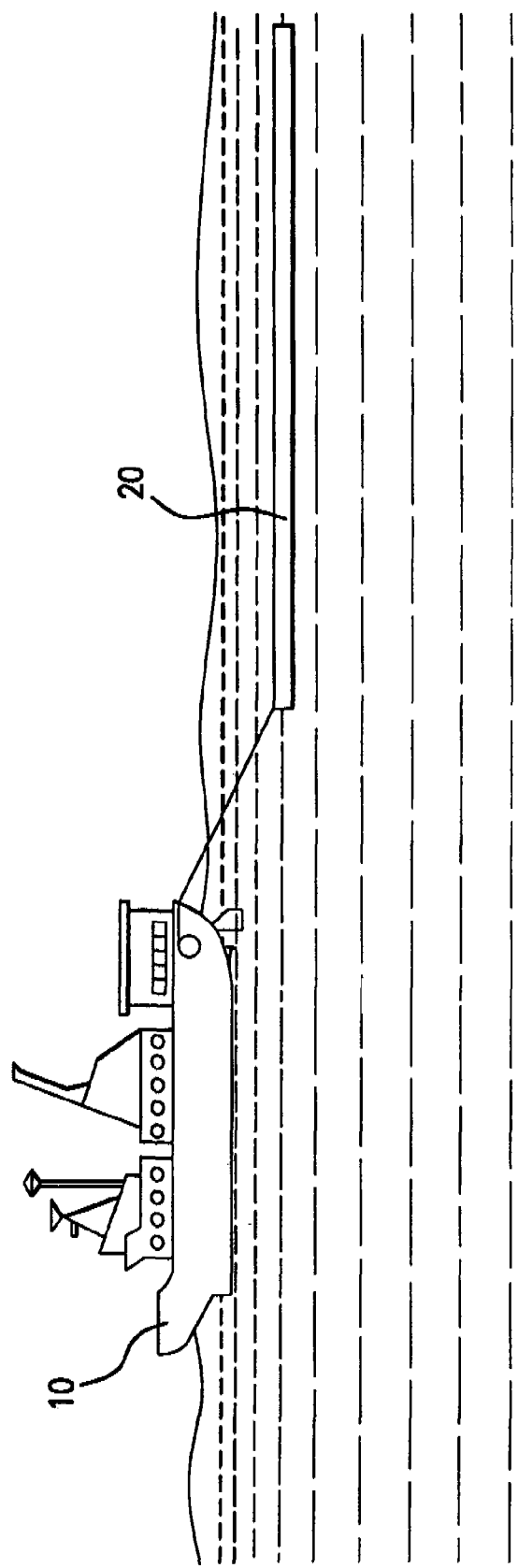
FIG. 1 is an illustration of a marine seismic exploration system in which the invention of the subject patent application may be utilized.

Referring now to the drawings, in which like reference numerals represent like parts throughout the several views, in FIG. 1, there is shown an exploration ship 10 towing a seismic streamer 20. Subsea geologic research and oil exploration is carried out through the use of vessels like the ship 10 which use acoustic pulses that are transmitted from the ship and through the water to penetrate the sea floor. The acoustic reflected return signals are received by the one or more seismic streamers 20 that are towed behind ship 10. Typically, a ship would tow an array of seismic streamers consisting of five to eight flexible tubular structures that are filled with an oil or a buoyant solid material and a plurality of sensors for receiving the acoustic return signals. The oil adds buoyancy to the seismic streamer and may also function as a dielectric.

Seismic streamers have a casing that may be formed of one or more layers. An outermost layer of a multilayer construction may be a sheath that is sleeved over an underlying tubular structure during assembly of the streamer. The underlying tubular structure may be an oil filled tube or a solid core with the internal electronic assemblies are molded in the solid core. As used herein, it is to be understood that the seismic streamer casing is the outermost tubular structure of a seismic streamer assembly, whether it is a sheath that is sleeved over another tube or solid core, or a single or multilayer tube that is itself filled by sensors and buoyant material.

The casing of the seismic streamers is formed of a flexible plastic material, such as polyurethane, and typically has a diameter of within the approximating range of 2 to 2.5 inches. The length of a seismic streamer may be as little as 100 feet, however, seismic streamers that are typically used for oil exploration have a length approximating 10 to 15 kilometers. The streamers are towed through the water at a depth that ranges from 5 to 15 feet, and they remain in the water for periods as long as 8 months.

Figure 2:
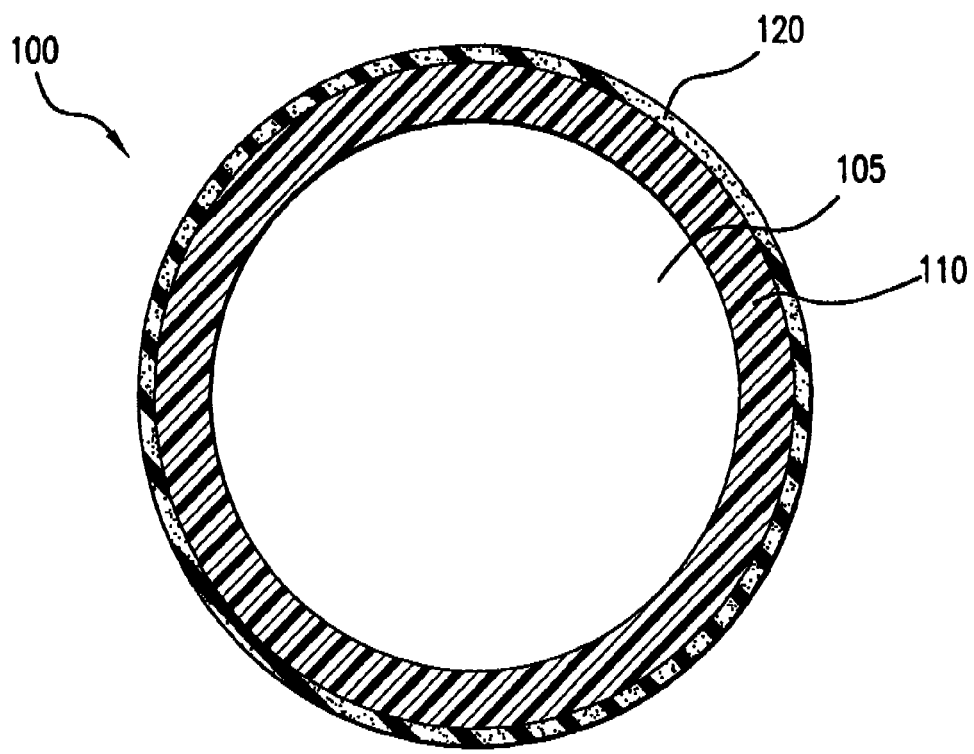
FIG. 2 is a cross sectional view of the seismic streamer casing of the present invention.

Although materials such as polyurethane have an outer surface that is not easily adhered to, they are subject to biofouling. The adherence of barnacles to the seismic streamer causes unacceptable levels of hydrodynamic drag and also disrupts the positioning of the streamers in tow such that reception of the acoustic signals is compromised. In order to overcome this problem, the invention of the subject patent application provides a seismic streamer casing 100, as shown in FIG. 2. Seismic streamer casing 100 includes a flexible tubing 110 having an outer layer 120 formed by a two-part heat cured silicone elastomer. The silicone elastomer layer 120 has a thickness within the approximating range of 0.0001 to 0.20 inches. The flexible wall of the tubing 110 surrounds a through-bore 105 into which the oil and instrumentation of the seismic streamer is received and has a thickness within the approximating range of $\frac{1}{32}$ to $\frac{1}{4}$ of an inch. The elastic material which forms the tubing 110, in addition to being flexible, must be hydrocarbon resistant to avoid degradation from contact with the oil which is contained within the seismic streamer. Tubing 110 may be formed of materials such as urethane, polyurethane and polyvinylchloride, with polyurethane being the most widely used material for seismic streamers used for oil exploration.

As previously noted, the surface of the tubing 110 is not very conducive to providing adhesion with other materials. Likewise, silicone elastomers generally do not exhibit strong adhesive qualities. To overcome these short comings, some form of pretreatment may be utilized to provide strong bonding of the silicone elastomer to the tubing 110. In the embodiment of FIG. 2, any pretreatment is in the form of a physical modification to the surface contours of the tubing 110. The types of pretreatment suitable for application to tubing 110 will be described in following paragraphs.

Figure 3:
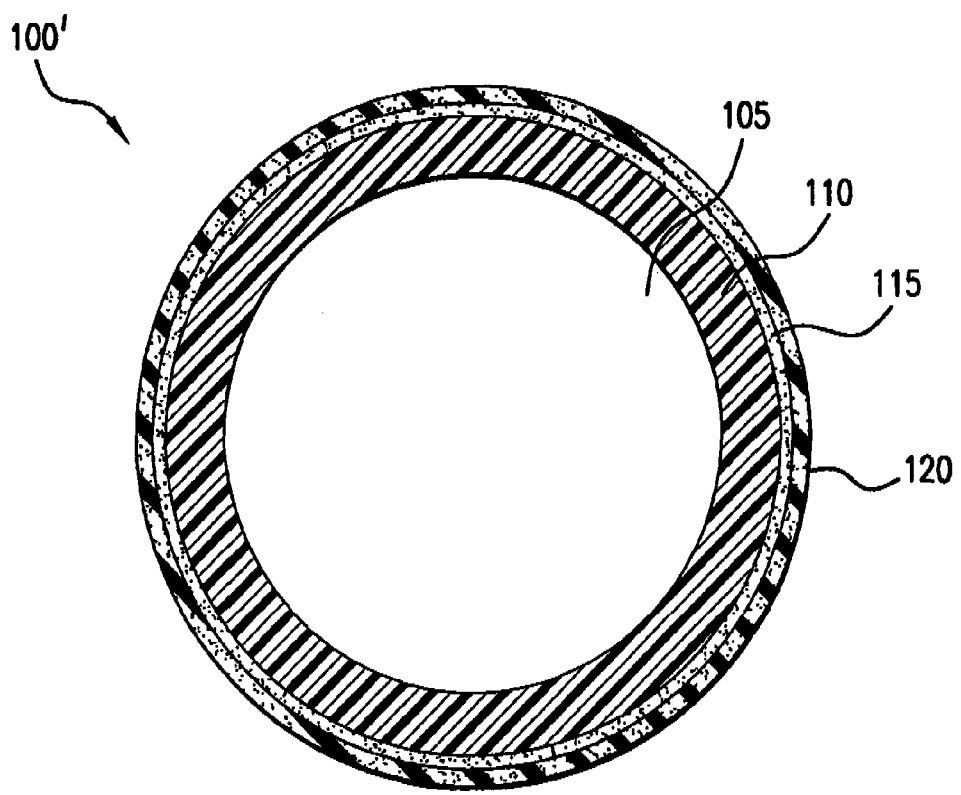
FIG. 3 is a cross sectional view of another configuration of the seismic streamer casing of the present invention.

In the configuration shown in FIG. 3, the seismic streamer casing 100' is formed with the same tubing 110 having a through-bore 105 and a two-part heat cured silicone elastomer 120. Additionally, seismic streamer casing 100' includes a intermediate layer 115, defining a tiecoat that is utilized to enhance the bonding between the silicone elastomer and the outer surface of the flexible material composition which forms tubing 110. This tiecoat 115 is a commercially available product which increases the bonding strength and toughness of the silicone elastomer. The use of one or more tiecoating layers may be combined with physical surface modification to further enhance adhesion between the layers. However, the flexibility of the material of tubing 110, as compared to the rigid substrates to which silicone elastomers have conventionally been applied as anti-biofouling coatings, requires the tiecoat composition to be equally flexible. Thus, the tiecoat compositions conventionally used in marine applications have not been found to be suitable for use in preparing seismic streamer casings, as they to not have the necessary flexibility. Tiecoat compositions formed by urethane or polyurethane based adhesive compositions may be used as tiecoat 115.

Figure 4:
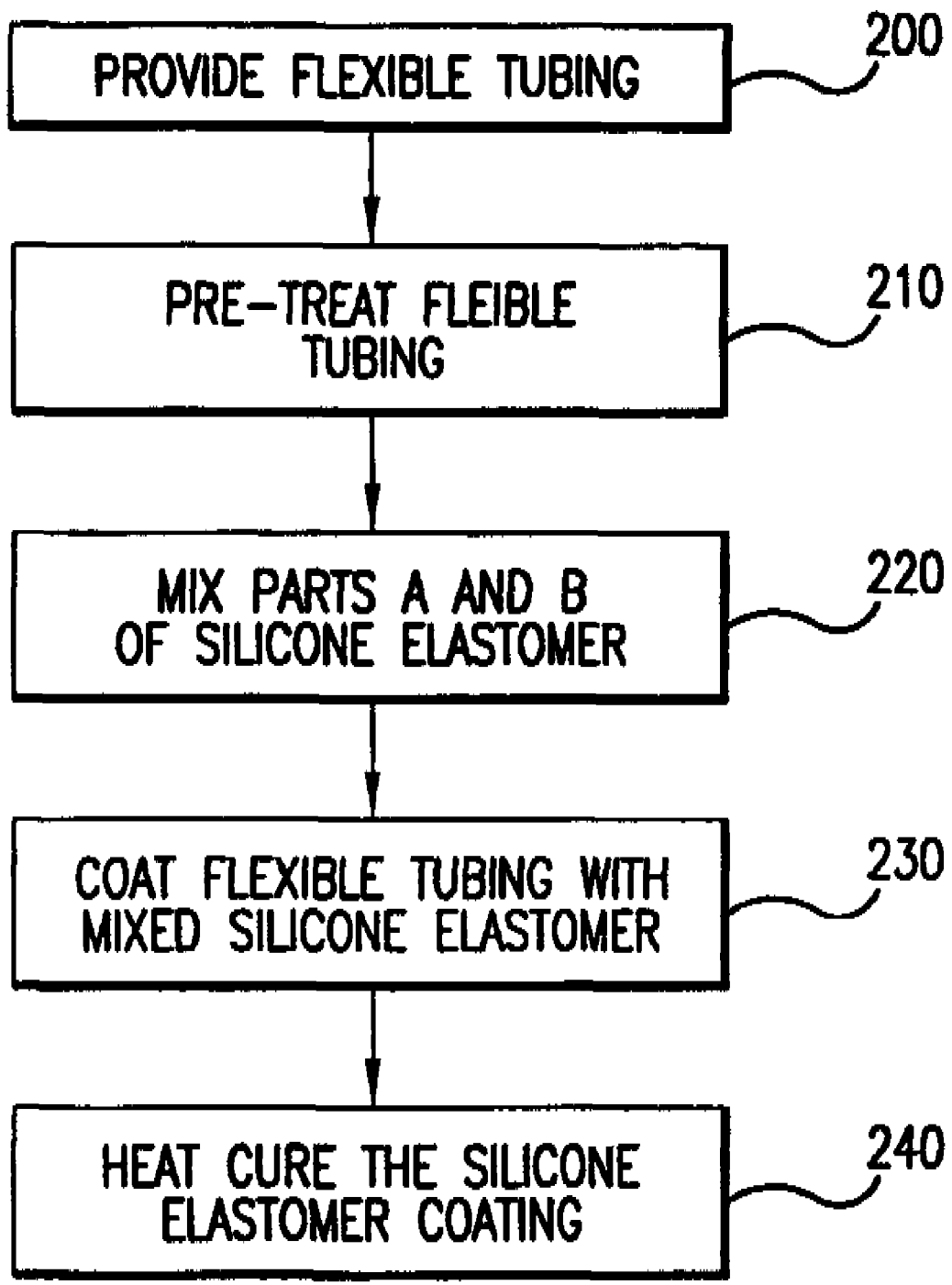
FIG. 4 is a block diagram of the method of the present invention.

Turning now to FIG. 4, there is shown a block diagram of the method of manufacturing the seismic streamer casing of the instant invention. In step 200, the flexible tubing is provided. As previously discussed, the polyurethane tubing is currently the commonly used material for seismic streamers. The tubing may be provided in predetermined lengths, i.e. 40 to 15,000 meters, for direct use by an end user. Alternately, the tubing may be provided in greater lengths and subsequently cut to the desired length subsequent to the curing process. If the flexible tubing is to be pretreated, which improves the bonding strength between the flexible tubing and the elastomer, the next step is 210, otherwise the process jumps to step 220.

In step 210 the flexible tubing is pretreated in order to improve the bonding between the flexible tubing and the silicone elastomer coating. The pretreatment consists of the use of mechanical or chemical means to modify the physical surface characteristics of the flexible tubing. Mechanical surface preparation may include etching of the surface by abrasion, laser ablation, particulate or fluid blasting, or plasma treatment. Chemical etchents, applied by a number of well known techniques, may also be utilized to physically alter the surface characteristics of the flexible tubing. The pretreatment process of step 210 may additionally or alternately include the application of tiecoat layer as a primer.

In step 220, the two parts A and B of the silicone elastomer are mixed. The parts A and B of the elastomer represent a polysiloxane polymer and a platinum catalyst. Suitable silicone elastomers for the practice of the instant invention are available from Dow Corning Corporation having the designation Silastic 590, 591, 592, 593, 594 and 595 and the General Electric Company having the designations SLE 5100, SLE 5300, SLE 5400, SLE 5500, and SLE 5600.

In step 230, the mixed silicone elastomer is coated on the flexible tubing. The methods for coating the tubing with the mixed silicone elastomer, to be discussed in following paragraphs, include spraying, brushing, dip coating, extrusion and flow coating. The coating process is enhanced by the pressurization of the tubing so that the flexible tubing maintains a constant and uniform contour throughout its length as it undergoes the coating process. Subsequent to coating, the coated tubing, in step 240, is exposed to heat for a predetermined time period, within the range of 1 to 30 minutes at a temperature in the range of 200 to 500 degrees Fahrenheit, to promote and/or accelerate the curing of the silicone elastomer coating.

Figure 5:
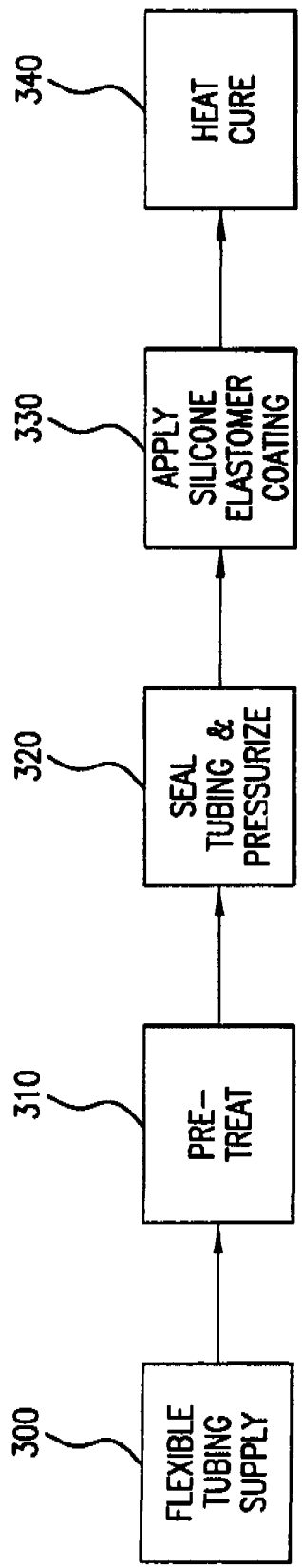
FIG. 5 is a block diagram illustrating the manufacturing processes for manufacturing the present invention.

Referring now to FIG. 5, there is shown a block diagram of a manufacturing process for producing the seismic streamer casing of the present invention. The process begins with the supply of flexible tubing 300 which, owing to the long lengths of the tubing required, is provided wound about a spool. The tubing is unwound from the spool and may be pretreated in order to increase the adhesion between the surface of the tubing and the silicone elastomer that will be subsequently applied. Pretreatment 310 can take a number of forms, as previously discussed. In one working embodiment of the method of the present invention, a plasma treatment was utilized to prepare the surface of a polyurethane tubing substrate. The outer surface of the tubing is passed in proximity to a plurality of symmetrically disposed electrodes wherein it is exposed to a high voltage corona discharge.

Subsequent to the pretreatment step, the ends of the tubing are sealed in step 320 and the tubing pressurized so that it maintains a uniform cylindrical contour as it is being processed to apply the elastomer coating thereto. The pressurization of the flexible tubing aids in maintaining a circular cross sectional contour of the tubing as it is coated, thereby providing uniformity of that processing by virtue of the geometry of the tubing. The silicone elastomer is applied in step 330. While any of the aforesaid methods of silicone elastomer coating application may be utilized, a variation of a dip coating process has been successfully used to coat the pretreated polyurethane tubing substrate, and will be discussed with respect to the process illustrated in FIG. 7 in following paragraphs.

Subsequent to the application of the silicone elastomer in the step 330, the coated tubing is then moved through a curing oven, in step 340, to heat the silicone elastomer to promote and/or accelerate the curing thereof. The curing oven heats the silicone elastomer to a temperature within the range of 200 to 500 degrees Fahrenheit and for a time period within the range of 1 to 30 minutes.

Figure 6:
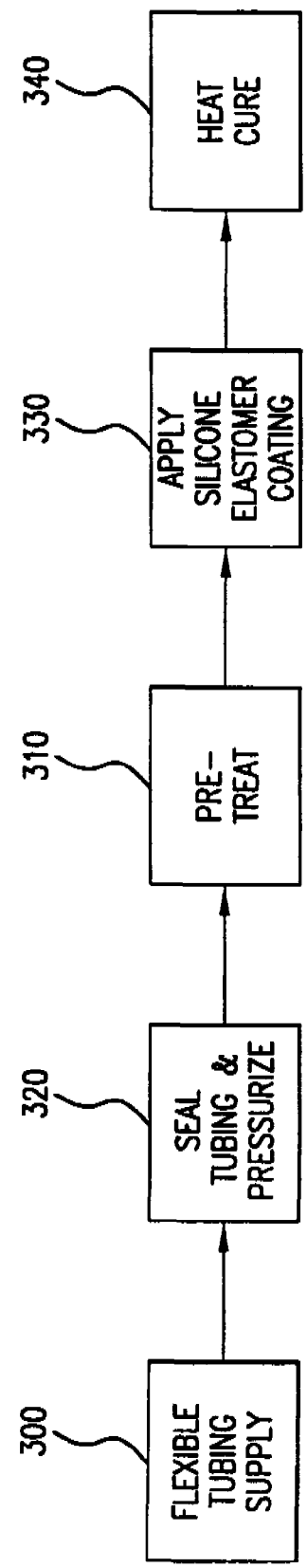
FIG. 6 is a block diagram illustrating the variation of the manufacturing processes for the present invention.

An alternate arrangement of the manufacturing process is shown in FIG. 6. In FIG. 6, the tubing sealing and pressurization step 320 is carried out while the flexible tubing is still substantially wound on the reel. By this manufacturing method, the pressurization of the flexible tubing occurs prior to the pretreatment step 310. The pressurization of the flexible tubing acts to ensure that the surface treatment occurs uniformly about the surface of the tubing by maintaining the cross sectional contour of the tubing substantially constant, as it does during the coating process. The uniformity of the physical surface treatment contributes to the improved adhesion between the flexible tubing and the silicone elastomer. Therefore, it can be seen that the pressurization of the tubing substrate is important to the processing of the flexible tubing to produce an anti-biofouling seismic streamer casing. The subsequent pretreatment 310, silicone elastomer application 330 and heat curing processes 340 are identical to those previously described.

Figure 7:
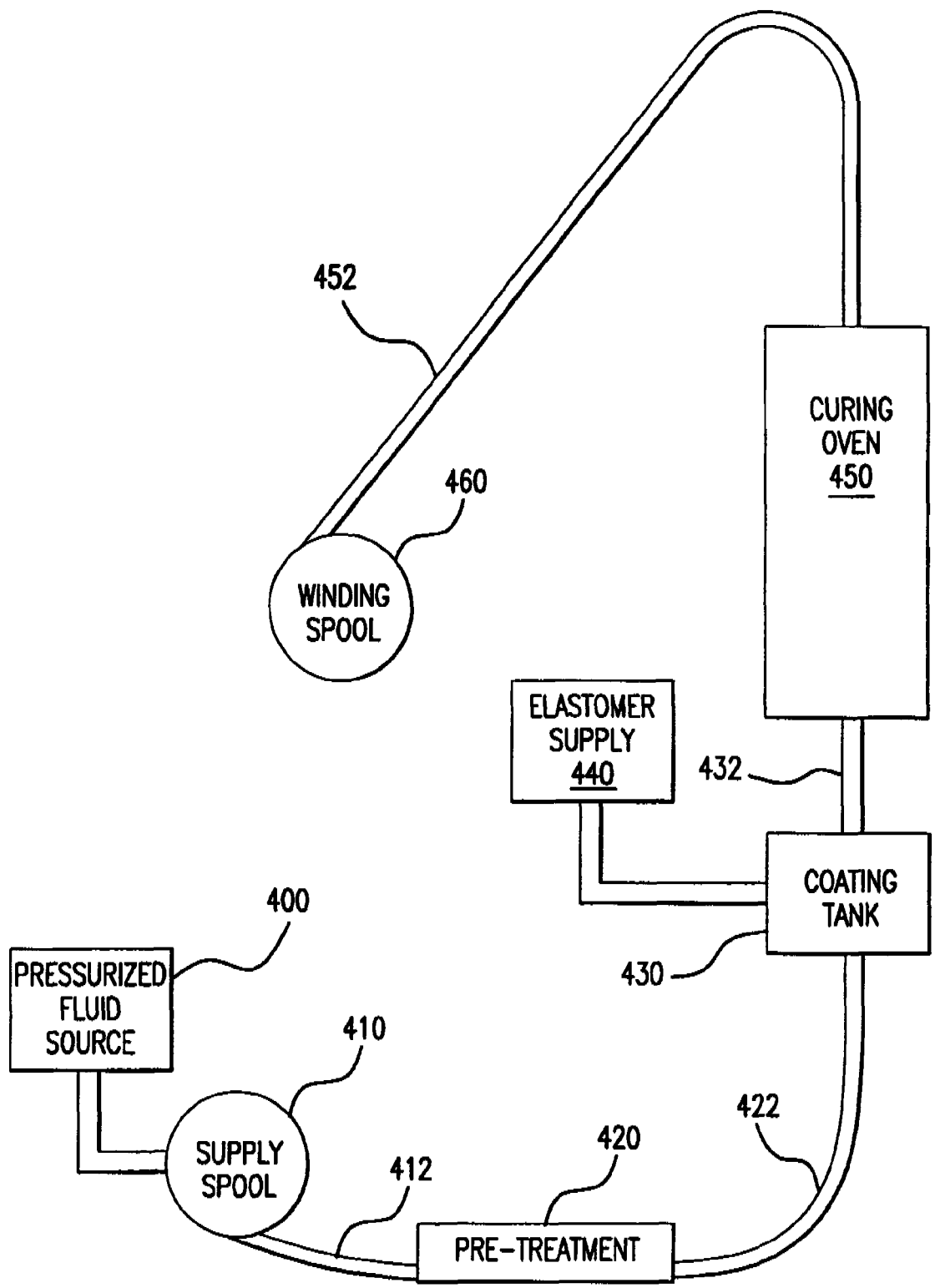
FIG. 7 is a schematic diagram illustrating the method for manufacturing the seismic streamer casing of the present invention.

In FIG. 7, an exemplary manufacturing process for seismic streamer casings is shown schematically. The process for providing the seismic streamers of the instant invention is a continuous process for sequentially carrying out the steps of the inventive method described herein. In the particular manufacturing process implemented in FIG. 7, the flexible tubing 412 being processed is wound on a supply spool 410. Prior to initiating the process, the opposing ends of the tubing, while on the spool, are sealed and tubing pressurized from a pressurized fluid source 400. Pressurized fluid source may be a air compressor or bottled source of compressed gas, such as nitrogen, or air. The pressurized fluid may be a liquid as well. The use of a liquid to pressurize the tubing may add additional steps of draining the fluid and drying the interior of the tubing, unless the liquid is the seismic streamer oil or a compatible liquid.

The pressurized flexible tubing 412 is first passed through a pretreatment chamber 420. As discussed earlier, one method of pretreatment that has been successfully utilized is a plasma treatment, however, other methods of physically altering the surface such as abrasion, laser abolition, and chemical etching may also be utilized. The treated tubing 422 moves from the pretreatment chamber 420 to a coating tank 430. The treated tubing 422 moves vertically through the coating tank 430, passing through a seal located at the bottom end of the tank. Coating tank 430 is supplied from an elastomer supply 440 wherein the parts A and B are mixed prior to their passage to the coating tank 430.

The coated tubing 432 continues vertically to a curing oven 450, wherein the tubing is maintained at the proper curing temperature, within the range of 200 to 500 degrees Fahrenheit, for the time period necessary to cure the silicone elastomer. Thus, if the required curing time is 20 minutes and the tubing is displaced at the rate of 1 foot per minute, the curing oven will have an overall height of approximately 20 feet to allow the tubing to have an adequate exposure to the curing temperatures. From curing oven 450, the seismic streamer casing 452 is provided to a winding spool 460 for subsequent transport to an end user. The supply spool 410 may carry an overall length of tubing for a single streamer, or a sufficient quantity for multiple streamers. Where the supply spool carries material for multiple streamers, a cutting operation may be interposed between the curing oven 450 and winding spool 460, such that each of a plurality of winding spools 460 are provided with a single seismic streamer casing wound thereon.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A biofouling resistant seismic streamer assembly, comprising:
   a flexible tubing seismic streamer casing having an external surface coated with a layer of a silicone elastomer such that the silicone elastomer remains connected to the seismic streamer casing to provide biofouling resistance during prolonged use of the seismic streamer assembly as a seismic streamer;

a plurality of acoustic signal receiving sensors within the seismic streamer casing; and a buoyancy material within the seismic streamer casing;

wherein said biofouling resistant flexible tubing is formed by a process comprising the steps of:
a. providing a flexible tubing;
b. optionally pressurizing said flexible tubing;
c. treating the surface of the flexible tubing to be coated;
d. mixing the silicone elastomer;
e. coating said mixed silicone elastomer on said flexible tubing; and,
f. heat curing said silicone elastomer coated on said flexible tubing.

2. The seismic streamer assembly of claim 1, wherein the seismic streamer casing is formed of polyurethane.

3. A biofouling resistant seismic streamer assembly, comprising:

a flexible tubing seismic streamer casing having an external surface coated with a layer of a silicone elastomer such that the silicone elastomer remains connected to the seismic streamer casing to provide biofouling resistance during prolonged use of the seismic streamer assembly as a seismic streamer; and a plurality of acoustic signal receiving sensors within the seismic streamer casing wherein said biofouling resistant flexible tubing is formed by a process comprising the steps of:
a. providing a flexible tubing;
b. optionally pressurizing said flexible tubing;
c. treating the surface of the flexible tubing to be coated;
d. mixing the silicone elastomer;
e. coating said mixed silicone elastomer on said flexible tubing; and,
f. heat curing said silicone elastomer coated on said flexible tubing.

4. The seismic streamer assembly of claim 3, wherein the seismic streamer casing is formed of polyurethane.

5. The seismic streamer assembly of claim 1, wherein the external surface comprises a pre-treated substrate to which the silicone elastomer is cured.

6. The seismic streamer assembly of claim 1, wherein the external surface comprises a plasma-treated substrate to which the silicone elastomer is cured.

7. The seismic streamer assembly of claim 1, wherein the silicone elastomer comprises sprayed-on silicone elastomer.

8. The seismic streamer assembly of claim 1, wherein the silicone elastomer comprises brushed-on silicone elastomer.

9. The seismic streamer assembly of claim 1, wherein the silicone elastomer comprises dip-coated silicone elastomer.

10. The seismic streamer assembly of claim 1, wherein the silicone elastomer comprises a flow-coated silicone elastomer.

11. The seismic streamer assembly of claim 1, further comprising a tiecoat between the external surface and the silicone elastomer.

12. The seismic streamer assembly of claim 11, wherein the tiecoat comprises at least one material selected from the group of a urethane based adhesive composition and a polyurethane based adhesive composition.

13. The seismic streamer assembly of claim 1, wherein the silicone elastomer is applied to the external surface in a continuous process comprising coating a portion of the flexible tubing with the silicone elastomer and heating the coated portion of the flexible tubing while another portion thereof is being coated with the silicone elastomer.

14. The seismic streamer assembly of claim 3, wherein the external surface comprises a pre-treated substrate to which the silicone elastomer is cured.

15. The seismic streamer assembly of claim 3, wherein the external surface comprises a plasma-treated substrate to which the silicone elastomer is cured.

16. The seismic streamer assembly of claim 3, wherein the silicone elastomer is cured directly to the external surface.

17. The seismic streamer assembly of claim 3, wherein the silicone elastoiner comprises a sprayed-on silicone elastomer.

18. The seismic streamer assembly of claim 3, wherein the silicone elastomer comprises a brushed-on silicone elastomer.

19. The seismic streamer assembly of claim 3, wherein the silicone elastomer comprises a dip-coated silicone elastomer.

20. The seismic streamer assembly of claim 3, wherein the silicone elastomer comprises a flow-coated silicone elastomer.

21. The seismic streamer assembly of claim 3, further comprising a tiecoat between the external surface and the silicone elastomer.

22. The seismic streamer assembly of claim 21, wherein the tiecoat comprises at least one material selected from the group of a urethane based adhesive composition and a polyurethane based adhesive composition.

\* \* \* \* \*